United States Patent Office 2,810,276
Patented Oct. 22, 1957

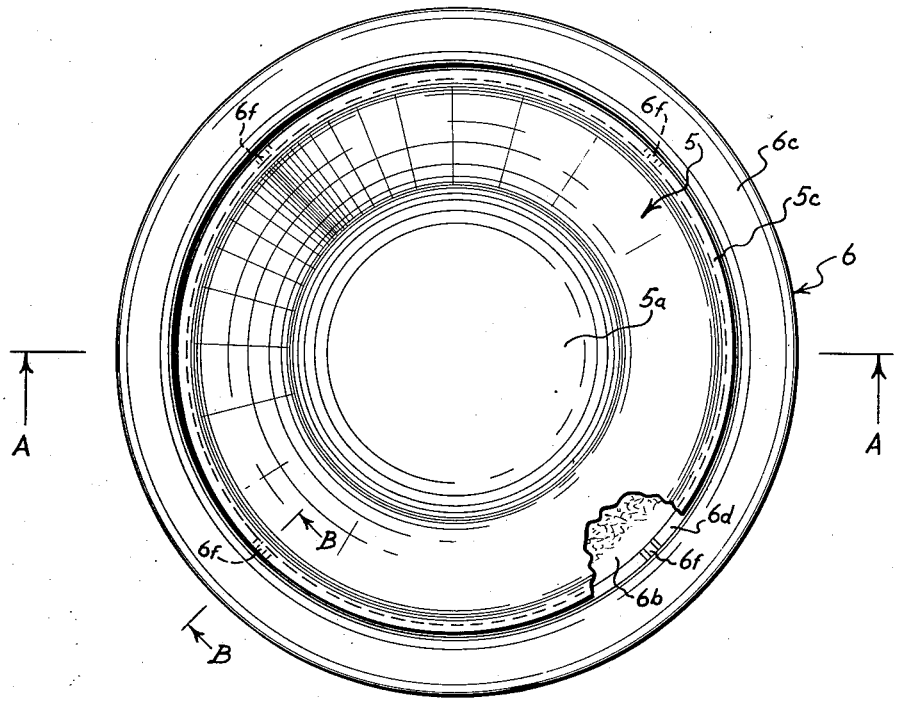
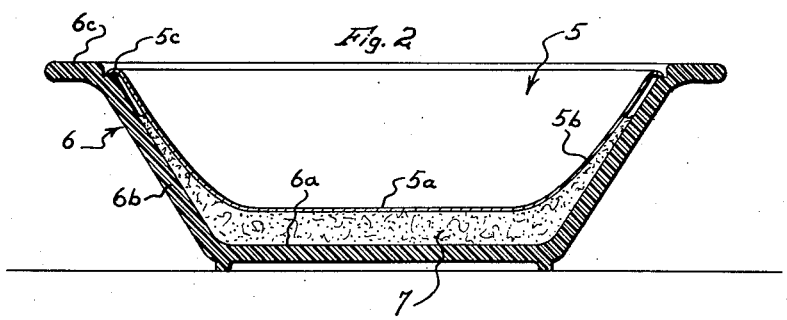
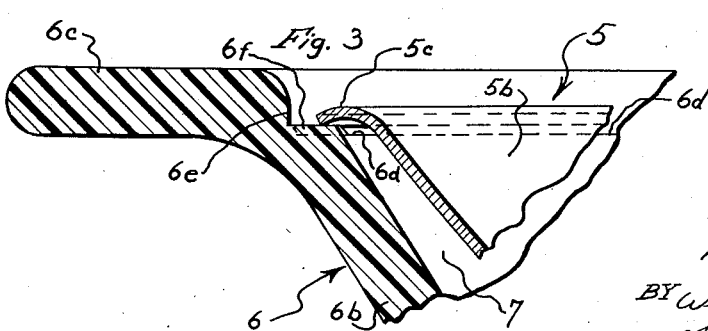

2,810,276

SERVICE UNIT FOR COLD FOODS

Arthur J. Murray, Minneapolis, Minn.

Application November 20, 1953, Serial No. 393,391

2 Claims. (Cl. 65—15)

This invention relates to serving units for cold or iced foods adapted for restaurant and home use to keep foods cold for a prolonged period, and to provide for the continuous cooling of the food after it has been served.

It is an object of my invention to provide a simple, substantially indestructible service unit comprising an inner cold food platter or plate and a compact outer protective and insulating platter of relatively non-conductive hard material, said platters being so constructed and functionally related that a minimum contact area only is established between the two, minimizing heat conduction transmissibly from the cold platter to the insulating platter and, further, producing efficient insulation of substantially the entire outer contour of the cold platter to substantially maintain the low temperature of the foods supported thereby.

It is a further object to provide a two-part, uncovered serving unit of the class described wherein a metallic, cold food platter is surrounded peripherally and at the bottom by a compact, protective and insulating platter, of non-frangible structure, said platters when assembled providing therebetween a thin, "dead air" insulating space or chamber covering the entire bottom and the peripheral walls of the head-conductive upper platter or plate.

Another object is the provision of a service platter of the class described having improved facilities for very efficiently maintaining a low temperature of foods contained therein, and the provision of an enlarged space or chamber between the inner and outer platters for the storage of a quantity of ice which is in contact with the inner platter for transmissibly absorbing the heat from the inner platter.

A further object is to provide for the easy separation of the inner and outer platters at all times. I have found that the combination of a tight seal between the assembled platters, as was done in my invention of a service unit for hot foods, Patent No. 2,545,528, and ice in the enlarged chamber creates a partial vacuum within the chamber due to reduction of air temperature and pressure which makes the inner platter adhere to the outer platter. On the plane of contact between the platters, I have provided small spacers or lugs which keep the inner platter minutely spacially displaced from the outer platter, thereby creating a passage for a restrictive inflow of air which destroys the partial vacuum. This restricted inflow of air does not substantially change the "dead air" or effect of the insulating qualities thereof.

These and other objects and advantages of my invention will more fully appear from the following description, made in connection with the accompanying drawings wherein like reference characters refer to the same parts throughout the several views and in which:

Fig. 1 is a top perspective view illustrating an embodiment of my serving unit in the form of a compact, individual plate assembly;

Fig. 2 is a sectional view of the assembled platters for service of salads and other foods at cold temperature, the section being taken at a—a in Fig. 1; and Fig. 3 is a fragmentary sectional view on a larger scale taken at b—b in Fig. 1.

My service unit for cold food includes an inner, relatively heavy metallic plate or platter 5 of symmetrical shape such as circular, oval or polygonal, preferably integrally formed from a heavy sheet of metal such as aluminum, stainless steel or the like, having a substantially flat bottom 5a which merges into a peripheral side wall 5b having at the upper portion thereof the outturned and substantially horizontal supporting flange 5c, having upper and lower surfaces, the lower surface of which constitutes a seating portion.

I provide an insulating and protective outer plate or platter 6 constructed from solid, relatively non-frangible insulating material shaped generally in conformance to the inner metal plate 5 and having a bottom 6a, a peripheral side wall 6b and a wide, outturned upper flange 6c, with a substantially flat and horizontal upper surface which facilitates gripping and handling of the entire unit in service. The inner contour of the plate or platter 6 is constructed throughout its bottom 6a and inner peripheral or side walls 6b of somewhat greater dimensions than the corresponding dimensions of the inner conductive plate 5. The upper and inner edge of the outer plate 6 is rabbeted or otherwise recessed to form a continuous annular plate-supporting surface or ledge 6d extending preferably circumferentially of the inner periphery of the plate 6 and at a distance below the upper surface of the flange 6c to dispose the upper surface of the flange 5c of the inner platter 5 when platters 5 and 6 are assembled below the upper surface of the flange 6c of the outer platter 6. The recessing or rabbeting of the upper inward portion of the outer plate 6 also forms a throat for accommodating upstanding shoulder 6e which extends circumferentially at the top of plate 6 and is of similar configuration but slightly larger in dimensions than the peripheral edge of the inner plate 5.

From Fig. 3 it will be seen that, with my structure as described, a shallow "dead air" space is provided between the bottom 5a, peripheral wall 5b and the inner portion of the flange 5c of the inner platter 5 and the interior of the insulating platter 6. It will further be seen that a space or chamber 7 is provided between the bottom 5a of the inner platter 5 and the bottom 6a of the outer platter 6 by separating them at a short vertical distance. The chamber 7 is for the storage of a quantity of ice or other such material used for cooling.

Upon the ledge 6d of the outer platter 6, there is constructed a plurality of circumferentially spaced pillars or lugs 6f, rising a minute distance above the surface of the ledge 6d. When the platters 5 and 6 are in assembly, the lower surface of the flange 5c of the inner platter 5 engages and is supported by the lugs 6f on the ledge 6d of the outer platter 6. The purpose of these lugs 6f is to minimize the physical contact between the platters 6 and 5 and to provide a non-sealing contact between the two platters 5 and 6. These lugs may be constructed on the lower surface of the flange 5c of the inner platter 5 to serve the same purpose.

It will be seen that I have devised a novel and highly efficient unit for storing and serving cold foods by surrounding the food-holding platter with "dead air" space and space for holding ice to cool the platter and food and an insulating platter for excluding heat, and providing for the prevention of any partial vacuum being formed in the "dead air" space by allowing a restricted flow of air into the "dead air" space.

It will, of course, be understood, that various changes may be made in the form, details, arrangement and proportions of the parts without departing from the scope of my invention.

What I claim is:

1. A service unit for cold foods comprising nested inner and outer platters having imperforate and spaced bottom and side walls and having outturned substantially horizontal flanges, the flange on the outer platter having a continuous annular inner ledge, said ledge being generally in a common plane and being provided with a plurality of very short upwardly projecting lugs, and the said inner platter having its bottom spaced in assembly some distance above the bottom of said outer platter providing a chamber for holding ice particles, the flange of the inner platter having an annular seating portion lying in a plane on said lugs and maintained by said lugs in spaced relation with said ledge to define a minute passage between said flange of the inner platter and the ledge of the outer platter thereby allowing a very restricted flow of air to prevent sealing and adherence of the inner platter against the outer platter upon the creation of a partial vacuum in said chamber due to reduction of temperature and pressure of the air within the space between the platters, and said platters being detachably and concentrically assembled with said flange of the inner platter engaging and being wholly supported from said ledge of the outer nonconductive platter.

2. A service unit for cold foods comprising nested inner and outer platters having imperforate and spaced bottom and side walls and having outturned substantially horizontal flanges, and said inner platter having its bottom spaced in assembly some distance above the bottom of said outer platter providing a chamber for holding ice particles, the flange on the outer platter having a continuous annular ledge disposed inwardly of the outer marginal portions of said flange, the flange on the inner platter having an annular seating portion with the circumference thereof overlying and supported by the annular ledge of the outer platter, said ledge and said annular seating portion of the outturned flange of said inner platter having concentrically arranged vertically spaced surfaces, one of said surfaces having a plurality of circumferentially spaced very short lugs affixed thereto for engaging against the other of said surfaces to maintain said ledge and said seating portion in spaced relation and defining a minute passage between the flange of the inner platter and the ledge of the outer platter thereby allowing a restricted flow of air to prevent sealing and adherence of the inner platter against the outer platter upon the creation of a partial vacuum in said chamber due to reduction of temperature and pressure of the air within said chamber between said platters.

References Cited in the file of this patent

UNITED STATES PATENTS

| Number | Name | Date |
|---|---|---|
| 234,739 | Beattie | Nov. 23, 1880 |
| 244,906 | Keys | July 26, 1881 |
| 947,373 | Coleman | Jan. 25, 1910 |
| 950,239 | Oskamp | Feb. 22, 1910 |
| 1,123,793 | Pick | Jan. 5, 1915 |
| 1,311,990 | Moller | Aug. 5, 1919 |
| 1,440,070 | Fry | Dec. 26, 1922 |
| 1,768,976 | Cuthbertson | July 1, 1930 |
| 1,858,728 | Creighton | May 17, 1932 |
| 1,881,873 | Newcomb | Oct. 11, 1932 |
| 1,948,778 | Zoia | Feb. 27, 1934 |
| 2,034,478 | Levy | Mar. 17, 1936 |
| 2,093,307 | Cline | Sept. 14, 1937 |
| 2,101,401 | Leppke | Dec. 7, 1937 |
| 2,128,371 | Lumpkin | Aug. 30, 1938 |
| 2,168,969 | Bickerstaff | Aug. 8, 1939 |
| 2,213,837 | Gill | Sept. 3, 1940 |
| 2,342,486 | Poglein | Feb. 22, 1944 |
| 2,474,995 | Wade | July 5, 1949 |
| 2,545,528 | Murray | Mar. 20, 1951 |
| 2,564,834 | Devine et al. | Aug. 21, 1951 |

FOREIGN PATENTS

| 632,619 | Germany | July 10, 1936 |